(12) United States Patent
Peterson et al.

(10) Patent No.: US 6,224,019 B1
(45) Date of Patent: May 1, 2001

(54) PARACHUTE LANDING VELOCITY ATTENUATOR

(75) Inventors: Leslie D. Peterson, Prescott; Lance C. Labun, Tempe; A. Gary Stutheit, Fountain Hills; Mynor J. Castro, Chandler; Marvin K. Richards, Gilbert, all of AZ (US)

(73) Assignee: Simula, Inc., Phoenix, AZ (US)

( * ) Notice: Subject to any disclaimer, the term of this patent is extended or adjusted under 35 U.S.C. 154(b) by 0 days.

(21) Appl. No.: 09/237,385

(22) Filed: Jan. 26, 1999

Related U.S. Application Data
(60) Provisional application No. 60/072,612, filed on Jan. 26, 1998.

(51) Int. Cl.[7] .............................. B64D 1/02; B64D 17/00; B64D 19/00
(52) U.S. Cl. ........................................ 244/138 R; 244/152
(58) Field of Search .................................. 244/138 R, 152, 244/142, 146, 145

(56) References Cited

U.S. PATENT DOCUMENTS

| | | | |
|---|---|---|---|
| 2,386,395 | 10/1945 | Hart | 244/151 |
| 2,477,907 | 8/1949 | Smith | 244/138 |
| 2,492,501 | 12/1949 | Robins | 244/138 |
| 2,730,317 | 1/1956 | Onanian . | |
| 3,109,615 | 11/1963 | Fritz | 244/138 |
| 3,362,664 | 1/1968 | McElroy . | |
| 3,387,805 | 6/1968 | Barnett et al. | 244/138 |
| 4,127,246 | 11/1978 | Andres | 244/138 R |
| 5,080,305 | 1/1992 | Stencel et al. . | |

OTHER PUBLICATIONS

Natick Research, Development and Engineering Center Report TR–97/014 entitled "Predictive Model of a Parachute Retraction Soft Landing System", 1997.

*Primary Examiner*—Charles T. Jordan
*Assistant Examiner*—Judith A. Nelson
(74) *Attorney, Agent, or Firm*—Shaw Pittman

(57) ABSTRACT

A gas-powered landing velocity attenuator for reducing the final descent velocity (and consequent ground impact load) of a parachutist or parachuted cargo. Immediately prior to impact, the gas source powers a device for drawing the load (either a parachutist or cargo) closer to the canopy of the paracute. In a first preferred embodiment, the load and the canopy are brought closer together by a single action piston and cable assembly powered by the gas source. A second embodiment uses an inflator assembly connected to an air bag or a braided tube to decrease the distance between the load and the parachute canopy.

19 Claims, 16 Drawing Sheets

PARACHUTE LANDING VELOCITY ATTENUATOR

The present application claims priority from U.S. Provisional Patent Application Ser. No. 60/072612, filed Jan. 26, 1998.

The U.S. Government has certain rights with respect to this invention, as provided for by the terms of Natick Research and Development and Engineering Contract No. DAAK 60-97-C-9233.

FIELD OF THE INVENTION

The present invention relates generally to devices or systems for controlling the descent rate of parachute payloads, and specifically to systems that significantly reduce descent velocity of the parachutist or of parachuted cargo immediately prior to impact.

BACKGROUND OF THE INVENTION

Despite significant improvement in many areas of parachute technology since the introduction of the parachute, injuries to jumpers and damage to cargo upon landing are still problems today.

Parachutes in general, and commercial sport parachutes in particular, have evolved over the years into highly sophisticated systems, and now often include features that improve the safety, maneuverability, and overall reliability of the parachutes. In certain applications, military parachutes have followed the general evolution of sport parachute systems. For example, the U.S. Marine Corps has recently begun using a highly maneuverable square ram-air parachute system for introduction of reconnaissance and special operations forces.

On the other hand, the U.S. Army's standard, round-canopy T-10 parachute used by combat paratroopers has been in service for nearly 50 years without major changes. The Army has identified excessive rate of descent as the chief contributor to paratrooper injuries. In fact, rate of descent and the resulting force of impact at touchdown has increased dramatically in recent years, primarily because the parachutists are carrying heavier combat equipment loads. The T-10 parachute was originally designed for a 250-lb. paratrooper, but with present-day equipment requirements, the T-10 parachute is being used for total suspended weights of up to 380 lbs. The added weight means that paratroopers descend faster and strike the ground with substantially greater force, making them more prone to injury.

Superficially, the solution to excessive rate of descent seems simple enough: use a larger parachute and/or a higher drag parachute. However, the existing T-10 combat parachute is already bulky, making it uncomfortable and awkward to wear and making exit from the airplane more difficult. A larger parachute would tend to add weight and bulk, thus making it even less comfortable and adding to soldier fatigue and degrading mobility. In addition, the slower rate of descent keeps the paratrooper in the air longer, thus increasing his vulnerability to enemy fire during a drop. A slower rate of descent can also make landing on target much more difficult in windy conditions, and will likely increase the dispersion of troops over the landing zone.

Cargo drop systems have similar problems. Although not as critical as with personnel parachutes, size, and particularly weight, are always important considerations for equipment that must be carried aloft. Within the parameters of any transport aircraft's lift capacity, every additional pound of parachute equipment that must be carried reduces the delivered cargo load correspondingly. Also, windy conditions are more of a problem for a cargo drop than for a paratrooper, because the cargo has virtually no directional control.

Therefore, the ideal parachute system for most military applications would have a relatively high rate of descent to minimize "hang time," and a low impact velocity to minimize landing injuries or cargo damage.

Several attempts have been made over the years to mitigate landing velocity problems in both cargo drop and personal parachute systems. Systems used have included air cushions, energy absorbing struts, and retro-rockets, as well as various approaches for reducing the distance between load and parachute just prior to ground impact.

One of the earliest systems for reducing the distance between the load and the parachute is disclosed in U.S. Pat. No. 2,386,395 to Hart, which utilizes a framework containing a plurality of elastic bands to store energy. The bands are either pre-loaded, or use the opening shock of the parachute to cock the system. Just prior to touchdown, the cocked system is released and pulls the jumper (or load) towards the parachute.

U.S. Pat. No. 2,477,907 to Smith employs a cable drum to effect a reduction in the distance between the payload and the parachute. Just prior to touchdown, a gas cartridge drives the drum to reel in the cable connecting the payload to the parachute.

U.S. Pat. No. 2,492,501 to Robins discloses a cargo drop method for arresting landing velocity. The load support line is retracted using a multi-reeled pulley system driven by a gas powered cylinder.

U.S. Pat. No. 3,109,615 to Fritz uses a ballistic cable reel to reduce impact in cargo drops. U.S. Pat. No. 3,387,805 to Barnett is a complex parachute system with various features aimed at reducing opening shock, improving canopy reliability, and including soft landing features. As a part of its soft landing apparatus, the system uses a cable drum to foreshorten the distance between payload and parachute just prior to touchdown.

U.S. Pat. No. 4,127,246 to Andres uses elastic cords to reduce landing velocity. A steel cable maintains a fixed distance between the load and the parachute. At the proper distance from touchdown, a probe or other sensing means fires a cable cutter, releasing the load. Free fall of the load stretches the elastic cords until the load rebounds relative to the parachute, reducing the actual rate of descent at impact.

The U.S. Army has also conducted analysis and experiments on parachute systems that reduce landing velocity by accelerating the load toward the parachute just prior to impact. A report by the Natick Research, Development and Engineering Center Report TR-97/014, entitled "Predictive Model of a Parachute Retraction Soft Landing System," describes one such effort. The report describes a computational model for system analysis, as well as hardware for experimental air drop tests. The apparatus used for these tests consisted of a multi-reeled pulley system driven by a piston/cylinder assembly, somewhat similar to the system disclosed in U.S. Pat. 2,492,501, to Robins, cited above.

SUMMARY OF THE INVENTION

The present invention is a landing velocity attenuator system for a parachute. A typical parachute system has a canopy and a load attached to the canopy by risers. The landing velocity attenuator of the present invention comprises a gas source which powers a means for drawing the load closer to the canopy immediately prior to impact, thus inducing slack in the risers and reducing the final descent velocity and consequent ground impact loads.

The present invention has two basic configurations for the means for drawing the load closer to the canopy. Both basic configurations have various embodiments depending on performance requirements of a particular application.

The first preferred embodiment of the present invention, which is referred to herein as the Cylinder-Landing Velocity Attenuator or C-LVA, is intended primarily for use with personnel parachute systems. A typical personnel parachute system includes a parachute connected by risers to a container which is strapped to the parachutist. The C-LVA uses a single acting piston and cable assembly to accomplish the basic objective of drawing the suspended load and the canopy together by causing slack in the risers. As shown in FIG. 1, and described in more detail below, in a typical C-LVA embodiment, the piston is packed inside the parachute container and the cable assembly is connected at one end to the piston and at the other end to the risers. The piston is powered by a gas source. When impending impact is detected, gas is released from the gas source, driving the piston such that it pulls the cable in the direction opposite to the canopy, causing slack in the risers and pulling the load closer to the canopy. The gas source may be either a cylinder of compressed gas, or it may be a gas generator, i.e., a device such as a pyrotechnic gas generator that generates gas by initiating a chemical reaction. The gas source must be capable of supplying the required volume of gas at a pressure that can stroke the piston in 50 to 100 milliseconds.

An alternative configuration of the system, referred to in this disclosure as the Landing Velocity Attenuator system or LVA, is intended for use with both personal and cargo parachute systems. The LVA configuration uses an inflatable system to decrease the distance between the jumper or cargo and the parachute immediately prior to touchdown.

One embodiment of the LVA system includes at least one riser connecting the load to the parachute, an inflatable structure, such as an air bag, inserted into each riser, a gas source for inflating the air bag, and a trigger device for initiating the gas flow. In the ready position, the risers are at full extension and the air bag is uninflated. Thus, the air bags are deployment causes slack in the risers drawing the load closer to the canopy, as illustrated in FIG. 16.

One advantage of the present invention is that it achieves larger velocity reductions and consequently fewer injuries than the prior art. Preliminary testing indicates that the present invention can reduce the parachutist's descent rate immediately prior to touchdown from the average 21 feet/second currently experienced using the standard T-10 system to about 16 feet/second approximately a 25 percent reduction with a corresponding 40 percent decrease in load at impact. For combat paratroopers, it is estimated that the resulting 40 percent decrease in landing impact loads will lessen the current rate of injuries by as much as 70 percent. The piston embodiment can accomplish even better results because of its efficient use of the energy stored in the gas source.

The present invention is also advantageous because of its simplicity. With respect to the C-LVA system, the simplicity translates into a lower noise level during activation, and more straightforward packing, since more of the activation hardware stays in the container. This reduces the possibility of entanglements. Moreover, because there is only one moving part and the risers are loosely packing into the parachute container, there is little effect on the jumper or the jumper's neighbors as a result of an inadvertent triggering of the gas supply. There would be, however, enough movement that the user would sense that the event had occurred.

With respect to the LVA configuration, an airbag-type device, with its inherently flexible design, occupies a small volume, and is easy to pack into a parachute system. Further, this simplicity results in a much more cost-effective approach to providing a sorely needed feature—i.e., landing velocity attenuation and a consequent reduction in ground impact loads—in both personal and cargo drop parachute systems.

A further advantage of the present invention is its flexibility. Each configuration has various embodiments depending on performance requirements of a particular application. For example, in the LVA system, air bag volume and configuration can be varied based on required retraction force, retraction distance, and acceptable inflation pressure. Even within the deployed volume limitations of a given LVA configuration, system performance may be adjusted by varying inflator output characteristics.

These and other advantages and objects of the present invention are described in greater detail in the detailed description of the invention, the appended drawings and the attached claims.

DETAILED DESCRIPTION OF THE INVENTION

Figure 1:
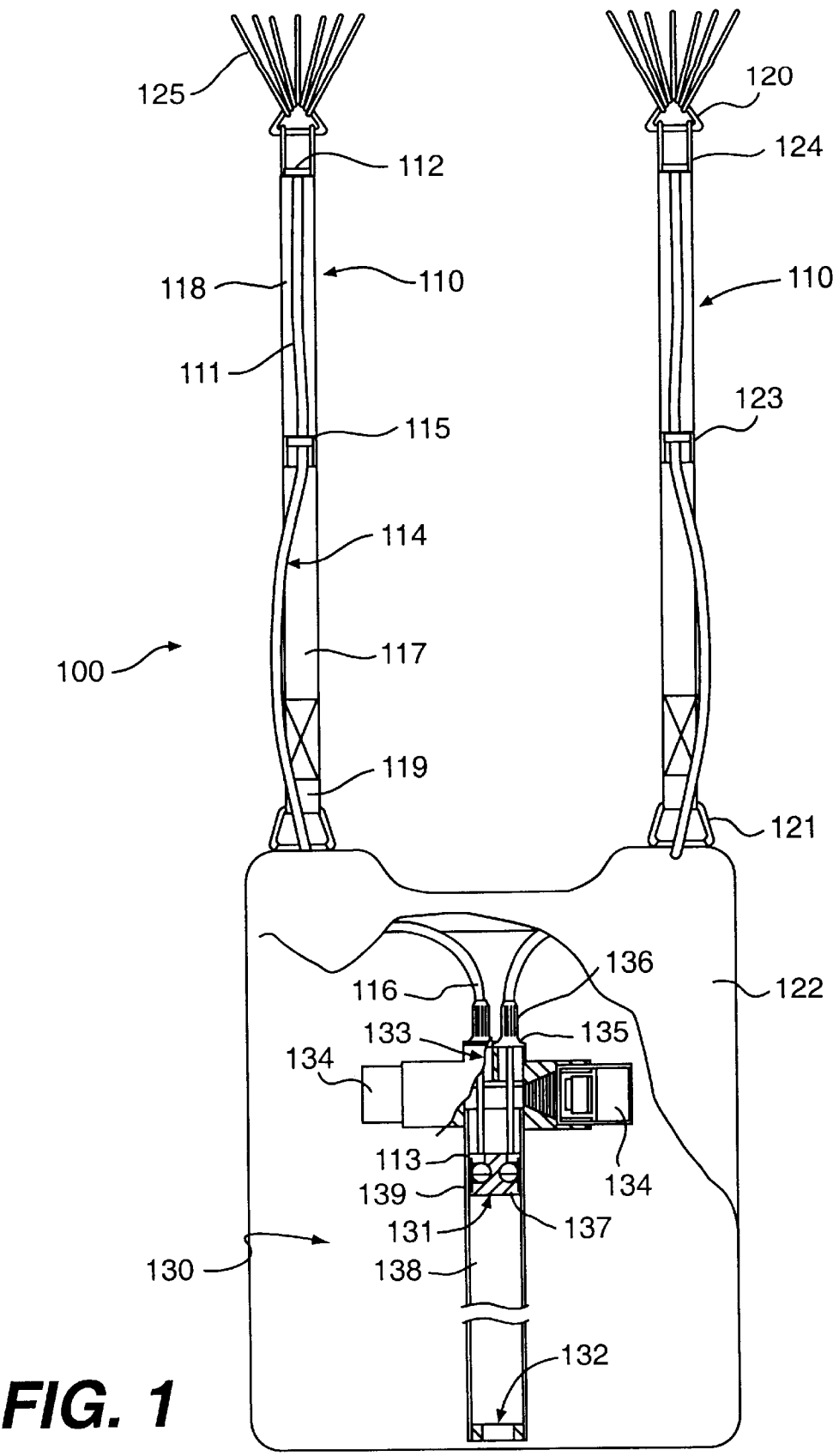
FIG. 1 is a partially broken away cross-sectional view of a cylinder landing velocity attenuator system in accordance with a preferred embodiment of the present invention prior to deployment.

Referring now to the figures, FIG. 1 is a schematic diagram showing the basic components and configuration, prior to deployment, of an embodiment of a cylinder-type landing velocity attenuator ("C-LVA") 100. C-LVA 100 includes identical cable assemblies 110, a piston assembly 130, and an activation assembly (not illustrated).

Cable assemblies 110 includes a means for connecting the parachute canopy to the load and a means for drawing the parachute canopy and load closer together. One type of connection means, shown in FIG. 1, includes a riser 117 having a first end 118 and a second end 119, a riser-canopy link 120 for affixing the first riser end 118 to the canopy lines 125, and a riser-container link 121 for affixing the second end of riser 119 to the parachute container 122. The drawing means can be, for example, a cable 111 having a first end 112 and a second end 113, a cable sheath 114 having a first end 115 and a second end 116, a riser-sheath link 123 for affixing the first sheath end 115 to the riser 117, and a cable link 124 for connecting the first cable end 112 to the riser 117 several inches above the first sheath end 115.

Figure 3:
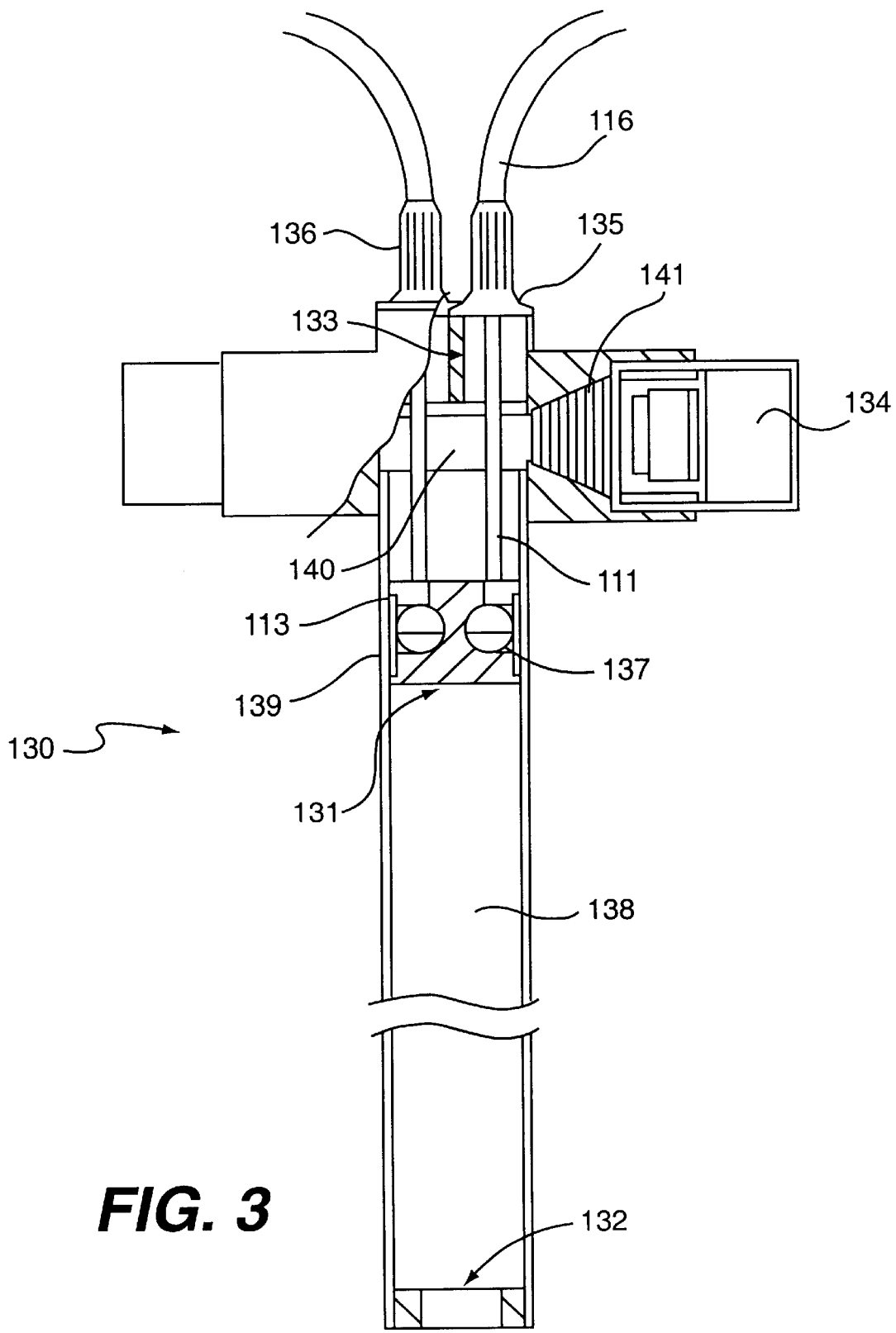
FIG. 3 is a partially broken away cross-sectional view of a piston assembly constructed in accordance with a first preferred embodiment of the present invention before it has been deployed.

The piston assembly 130, shown as well in FIG. 3, includes a single acting piston 131, a piston stop 132, a seal 133, a gas source or generator 134 for providing high pressure gas to the piston, a port 140 providing the fluid connection for the flow of gas from the gas generator into the piston chamber, a gas filter 141, a cable port 135 for receiving the cable 111, a sheath adapter 136 for connecting the second sheath end 116 to the piston assembly 130, a mount 137 for attaching the second cable end 113 to the piston 131, piston seal 139, and a housing 138 (a "cylinder" housing is illustrated) encompassing the piston 131.

Gas source or generator 134 can be one or more of the three most common types of air bag gas generator systems (pyrotechnic, hybrid, or stored or compressed gas). Pyrotechnic gas generators are the lightest and smallest for a given output of gas, but tend to burn hottest and produce the greatest amount of undesirable particulates. Filter 141 should be used with pyrotechnic gas generators to remove particulates and help cool the gas. Stored or compressed gas generators are the largest and heaviest, but provide the coolest and cleanest gases. Hybrid generators, combine a stored gas chamber and a pyrotechnic chamber. Upon initiation, the gas pressurizes the cylinder, thus driving the piston assembly down cylinder 138. Overall system requirements will determine the preferred gas source and output for various applications (personnel, cargo, etc.) of the landing velocity attenuator. If a pyrotechnic system is employed, possible propellants may include sodium azide, ammonium nitrate, or nitrocellulose. Because of flammability concerns, any pressurized gases that might be used in a stored or hybrid gas system should be inert. Possible choices for stored gas include nitrogen, argon, helium, carbon dioxide, or nitrous oxide.

An appropriate trigger means can be a sensor means, such as a ground or proximity sensor, combined with electric or electromechanical hardware for initiation of gas flow from gas generator or source 134. Depending on the timing required for a given application, the proximity sensor could be a contact device such as a mechanical probe, switch, or acceleration-activated switch. If deployment at a greater height above the landing point is required, an ultrasonic range finder, laser range finder, or radar-based proximity sensor could be employed to sense the appropriate altitude.

In actual use, the piston assembly 130 is preferably fixed inside parachute container 122 along with the hardware necessary to trigger the gas source. As shown in FIG. 1, in the ready position, the cable system is configured such that risers 117 and cables 111 are outstretched. Preferably, risers 117 are essentially fully extended and first cable ends 115 are preferably essentially at the maximum possible distance away from first sheath ends 115. The ready position of the piston assembly is illustrated alternatively in FIGS. 1 and 3. Prior to deployment, piston 131 is retracted toward the end of housing 138 closest the gas source. Preferably piston 131 is fully retracted toward the gas source.

Figure 2:
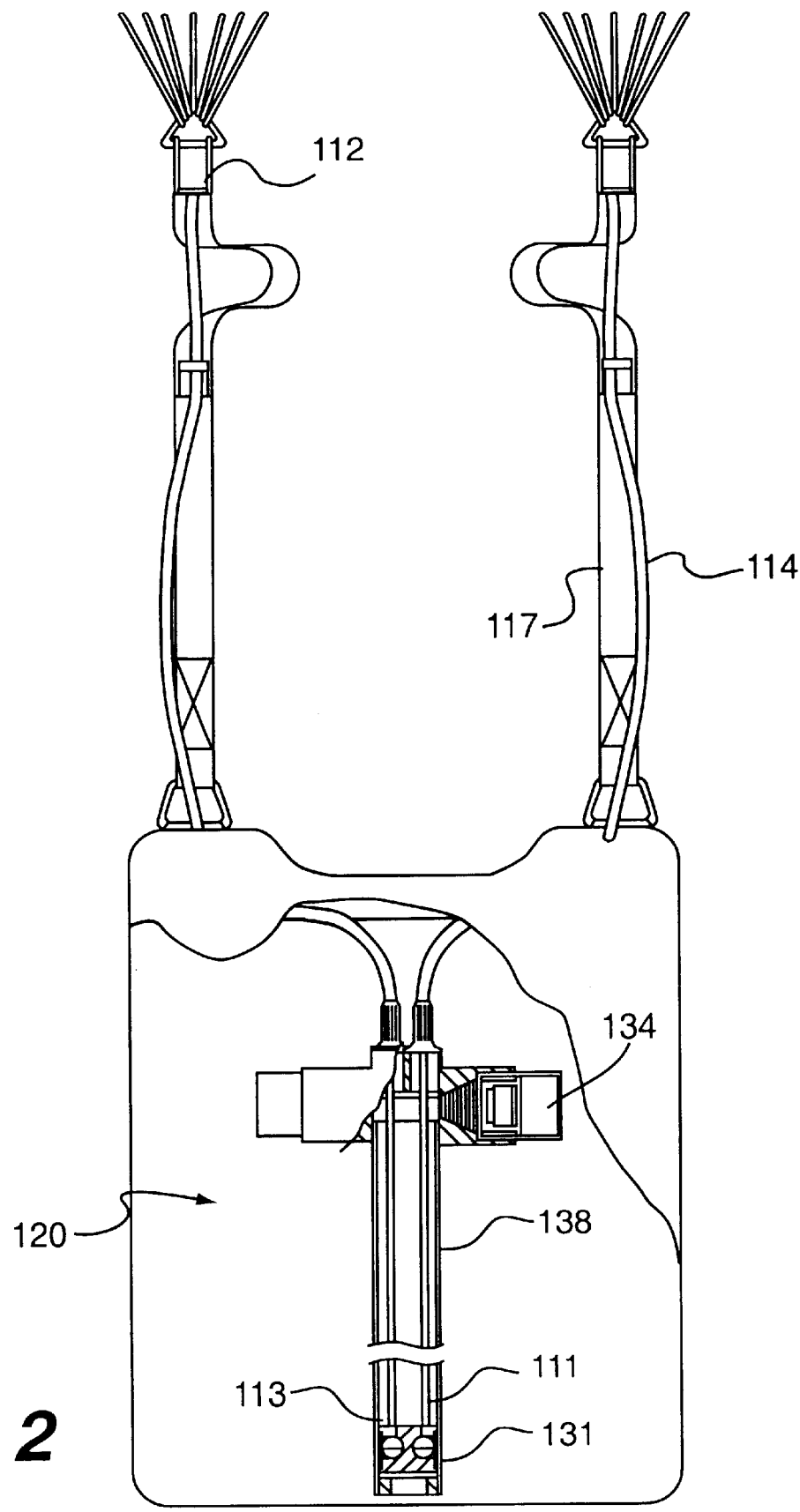
FIG. 2 is a partially broken away cross-sectional view of the cylinder landing velocity attenuator system of FIG. 1 after it has been deployed.
Figure 4:
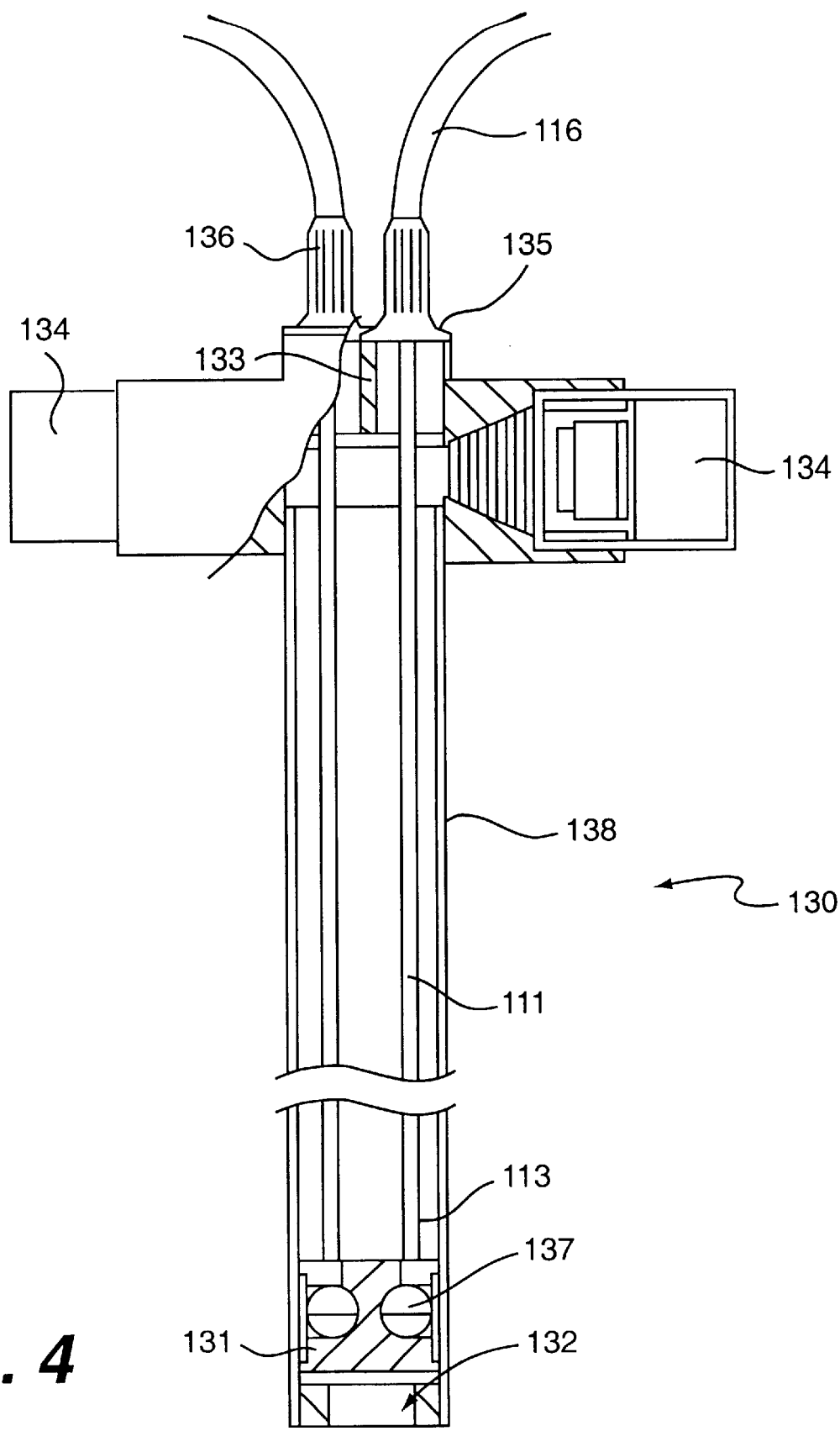
FIG. 4 is a partially broken away cross-sectional view of the piston assembly of FIG. 3 after it has been deployed.

At the desired height above impact, the trigger initiates the flow of gas from gas generator or source 134, causing the landing velocity attenuator system to deploy. As shown in FIGS. 2 and 4, when the gas is released, piston 131 is forced to travel along housing 138 pulling cables 111 with it. Because each sheath 114 is secured to a riser 117 and because each cable 111 is attached at one end to piston 131 and at the other end to a riser 117 but is slidably housed within its respective sheath 114, the piston travel causes first cable ends 112 to converge with first sheath ends 115, thus shortening the effective length of risers 117 and drawing the canopy (not illustrated) and the suspended load closer to each other, thus reducing the landing velocity. The "stroking" distance, or reduction in length of the riser can be up to 16 inches if the piston assembly is designed to fit into a typical parachute container. It is evident that if the piston end of the cable (i.e., the second end 113) were instead fixed to the housing and a pulley placed on the piston 131, it would be possible to achieve a riser displacement of almost twice the piston displacement. Of course the pressure required to drive the piston would be doubled.

Figure 6:
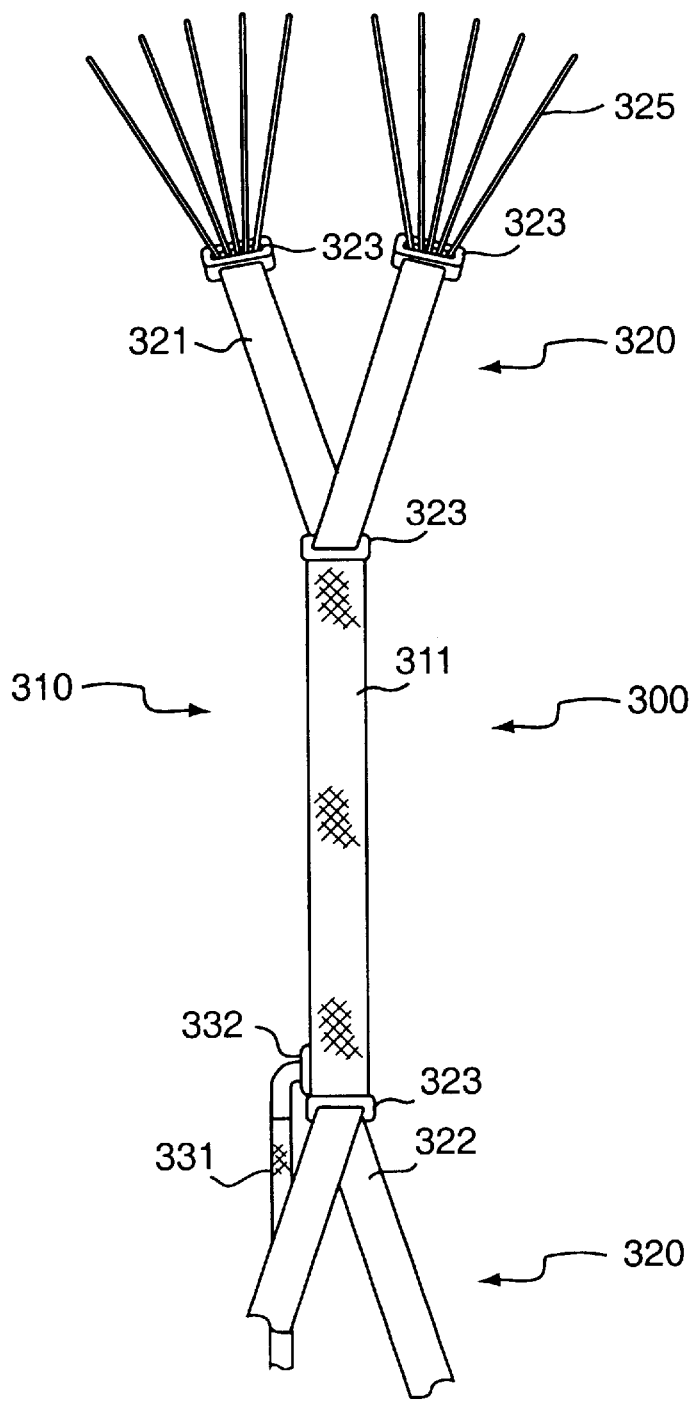
FIG. 6 shows an air bag type landing velocity attenuator system in accordance with a first preferred embodiment of the present invention.
Figure 6A:
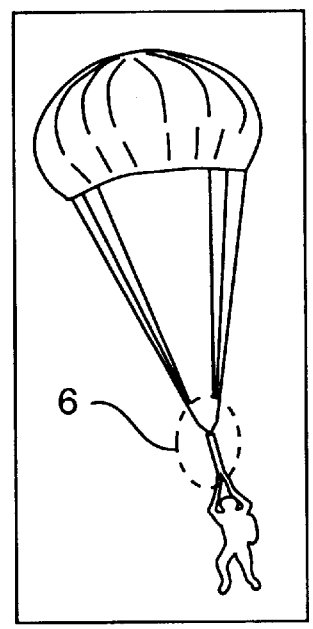

FIG. 6 depicts the basic components and arrangement, prior to deployment, of an embodiment of a landing velocity attenuator 300 which uses an inflatable structure, such as an air bag assembly 310. The attenuator 300 includes an air bag assembly 310, a riser assembly 320 and an inflator assembly.

In a preferred embodiment, the air bag assembly 310 includes braided tube 311 such as the one disclosed in U.S. Pat. Nos. 5,322,322 and 5,480,181, which are incorporated by reference herein. Braided tube 311 is comprised of continuous high-strength fibers impregnated with an elastomer. The tube may include an internal elastomeric bladder to improve gas retention. The fibers form intersecting spirals and change their orientation (including longitudinal angles) upon inflation. Prior to inflation, the spirals are stretched longitudinally and the tubular structure has a relatively small diameter. Subsequent to inflation, the braid fibers orient themselves in such a way that the entire tube increases in diameter and shortens in length, if unconstrained by approximately 20 percent. The air bag system known as the Inflatable Tubular Structure, or ITSO, described in U.S. Pat. No. 5,322,322, is suitable for use as braided tube 311.

The riser assembly 320 includes a canopy riser 321 linking the air bag assembly 310 to the canopy lines 325, a payload riser 322 linking the air bag assembly 310 to the payload/parachutist (not illustrated), and attachment buckles 323 located: i) at each end of the air bag assembly 320 for connecting the risers to the air bag assembly; ii) at each end of the canopy risers 321 for connecting the risers to the canopy; and iii) at each end of the payload risers 322 for connecting the risers to the parachutist/payload assembly. The function of the risers is to reduce "line twist" (i.e., rotation of the suspended weight about the vertical axis) during descent, to help reduce load on the air bag(s) prior to deployment, and to act as a redundant safety measure in case of a severe malfunction, such as rupture of the air bag unit(s).

The inflator assembly includes a means for deploying air bag assembly 300 and an automatic trigger means for automatically triggering the deployment means at a predetermined altitude prior to impact. The deployment means includes a gas source (not illustrated) and a means for fluidly connecting the gas source to the piston. The fluid connection means includes an inflation tube 331, an attachment 332 for linking the inflation tube 331 to the air bag assembly 310, and an attachment (not illustrated) for linking the inflator assembly to the parachute harness. The gas source and trigger device can be as described above for the C-LVA configuration of the present invention. As illustrated, the inflator assembly is located outside the air bag assembly 310. However, the inflator assembly may alternatively be enclosed within the air bag assembly 310 itself.

In actual use, the landing velocity attenuator air bag assembly 300 (i.e., the air bag assembly 310, the riser assembly 320 and the inflator assembly) is packed inside a parachute container in such a manner that upon canopy deployment, the riser assembly 320 is extended. Preferably the riser assembly 320 is always at full extension.

Figure 7:
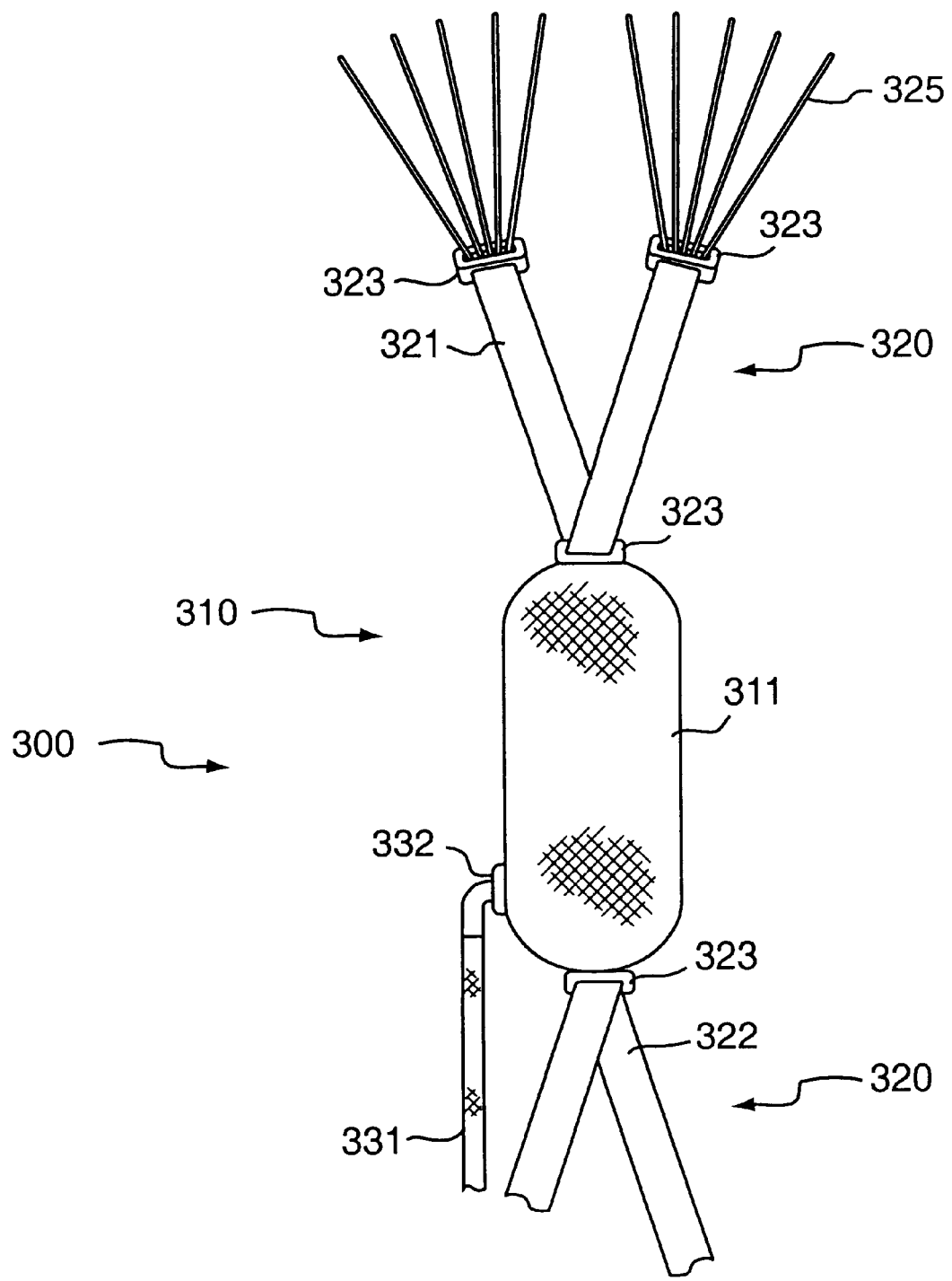
FIG. 7 shows the landing velocity attenuator system of FIG. 6 after it has been deployed.

FIG. 7 shows the landing velocity attenuator system of FIG. 3 after it has been deployed. At the desired height above touchdown, the trigger device fires the air bag inflator. Once the inflator is initiated, the deployment of the air bag and resulting length reduction of the riser system accelerates the jumper (or cargo) toward the parachute, and thus reduces the landing velocity. The stroking distance is related to the length of tubular air bag structure chosen and depends on the application and desired retardation of final descent.

Figure 10:
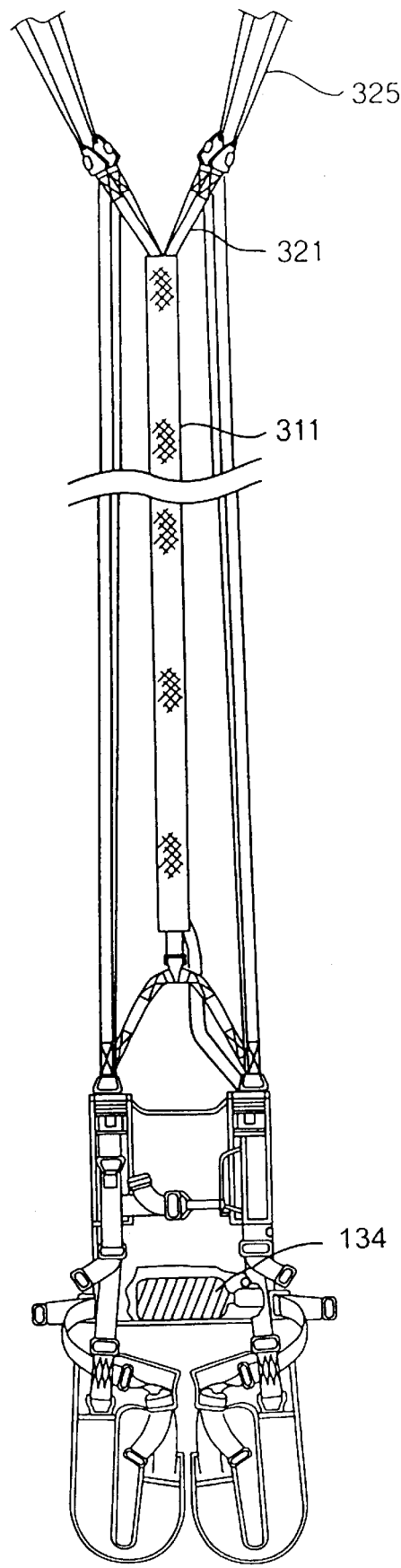
FIG. 10 shows an embodiment of the landing velocity attenuator system in the approximate proportions required to slow the final descent velocity of a parachutist by approximately 25 percent.
Figure 11:
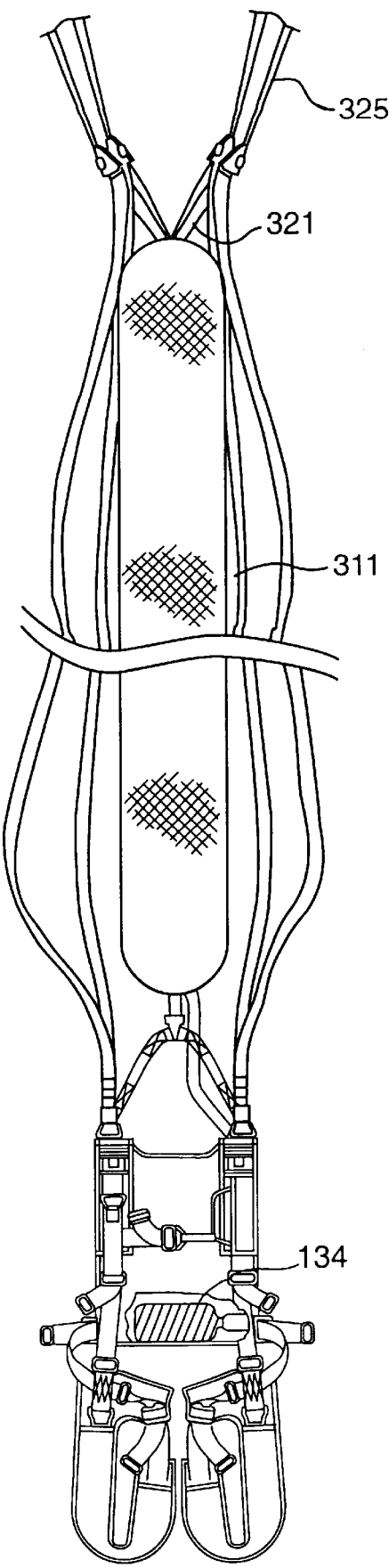
FIG. 11 shows the landing velocity attenuator system of FIG. 10 subsequent to inflation.

FIG. 10 illustrates, prior to deployment, a tubular air bag structure based personnel landing velocity attenuator system in the approximate proportions required to generate sufficient "stroke" to slow the final descent velocity of a parachutist by approximately 25 percent. Preliminary tests indicate that a length of undeployed tubular air bag structure of on the order of 8 feet would be required to achieve this result. Inflated, the tubular structure would contract by about 20%, a reduction of more than 16 inches, and thus reduce the distance between the parachute and parachutist sufficiently to slow final descent velocity from about 21 feet/second to approximately 16 feet/second. In these proportions, the tubular air bag is inflated with approximately 60 liters of gas, to a pressure of approximately 10 psig. FIG. 11 depicts this configuration subsequent to inflation.

Figure 8:
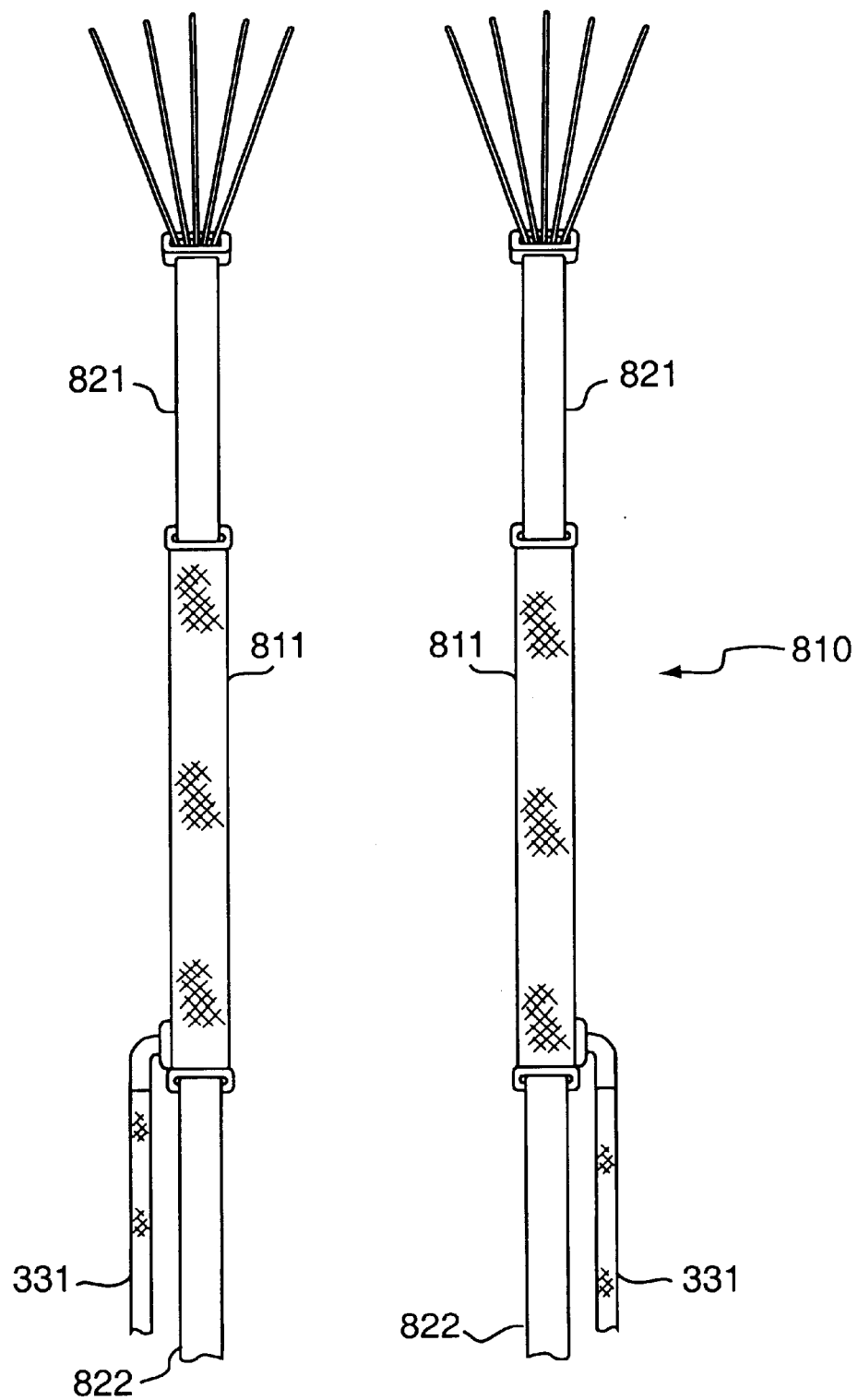
FIG. 8 shows a landing velocity attenuator system constructed in accordance with a second preferred embodiment of the present invention.
Figure 9:
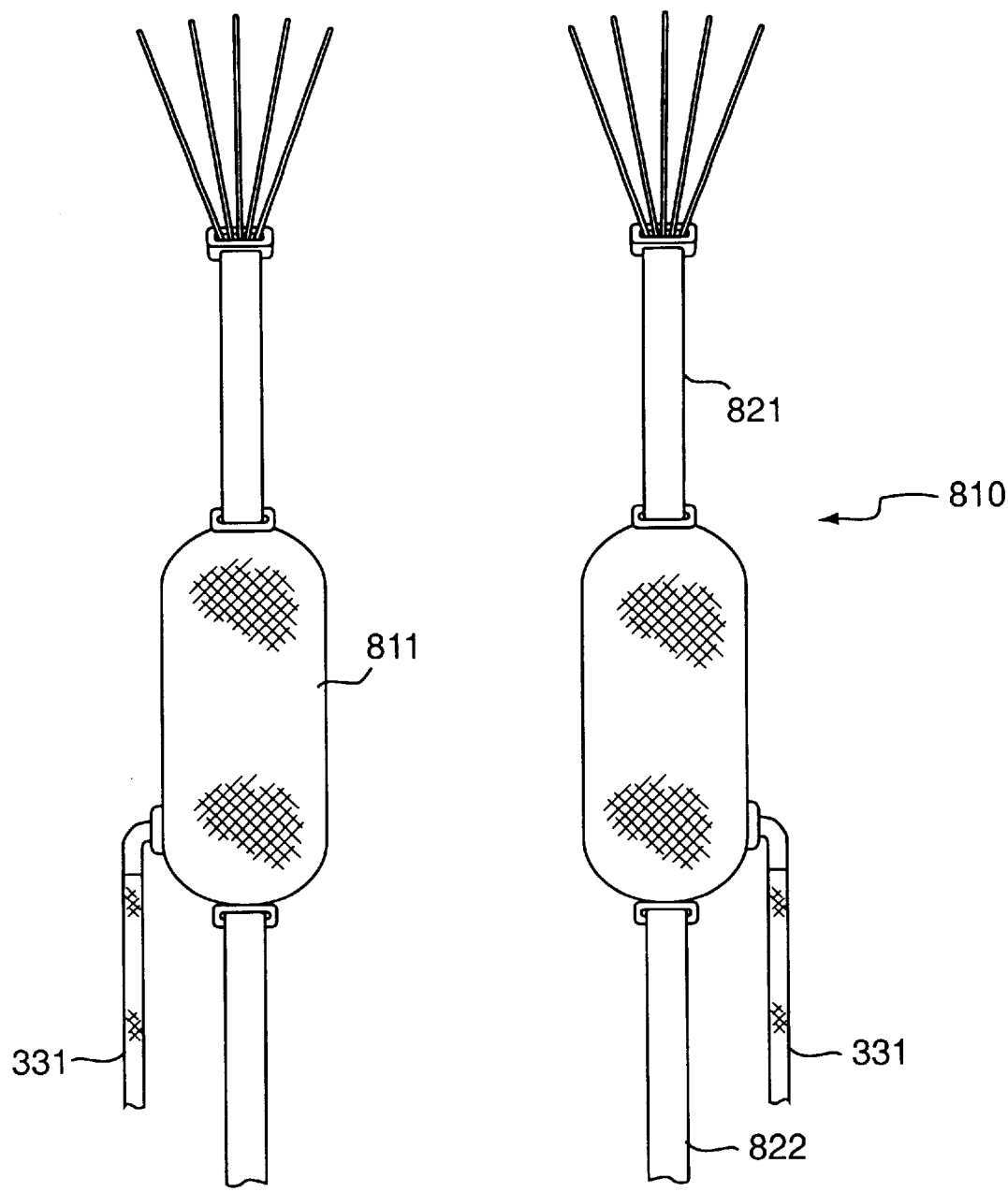
FIG. 9 shows the landing velocity attenuator system of FIG. 8 after it has been deployed.

As shown in FIGS. 8 and 9, depending on application requirements, the landing velocity attenuator system may employ two or more air bag assemblies 810, preferably positioned side-by-side. FIG. 8 illustrates the essential elements of a dual inflatable tubular air bag structure based system prior to inflation, whereas FIG. 9 shows the same arrangement fully deployed. Just as for the single inflatable tubular structure system described above, a predetermined length of inflatable tubular structure 811 is installed in the parachute riser(s) 821, 822 and a conventional gas generator or other inflation device is either installed in or connected to the inflatable tubular structure.

Figure 12:
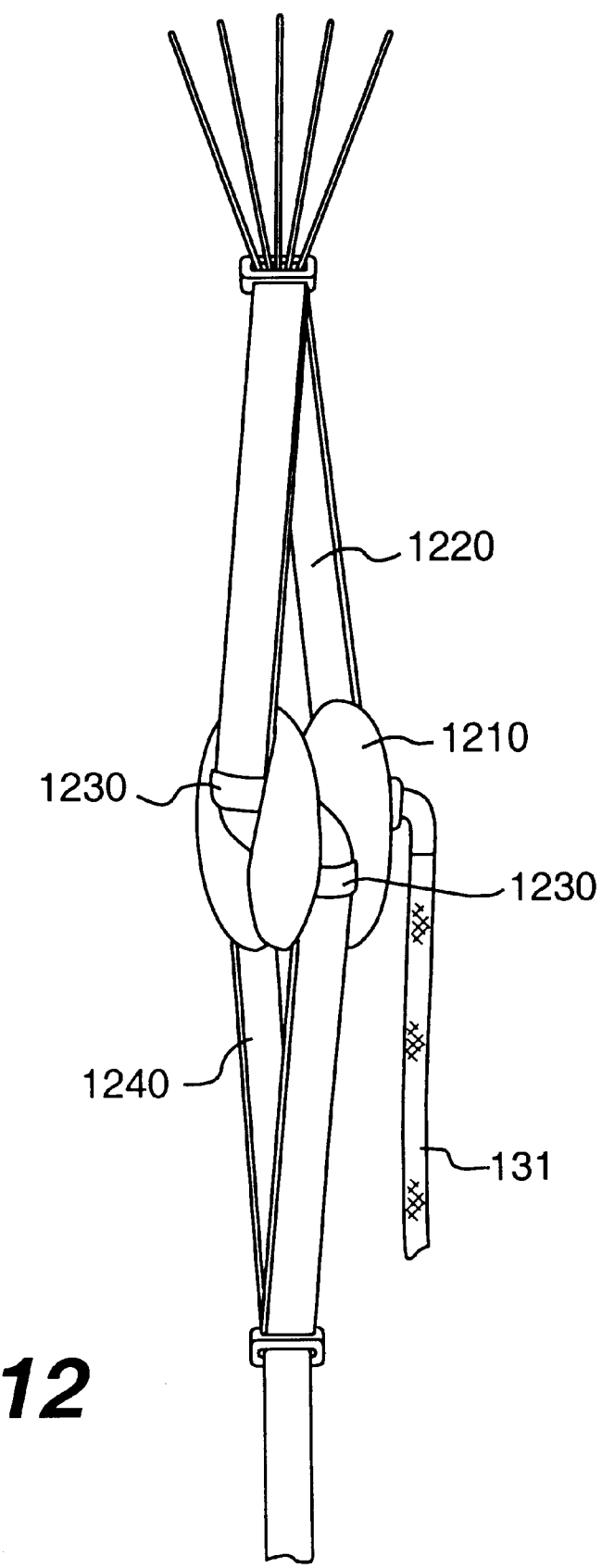
FIG. 12 shows a first preferred embodiment of a spherical landing velocity attenuator system constructed in accordance with the present invention.

FIG. 12 shows another air-bag type landing velocity attenuator system in accordance with the present invention.

In this embodiment, a spherical airbag 910 rather than tubular air bag is used. Spherical air bags are particularly useful in situations in which the use of a lengthy tubular air bag is not practical or desirable. Such spherical air bag assemblies may be constructed of materials similar to those typically found in automotive frontal-impact inflatable restrains. For example, any pliable, impermeable fabric capable of maintaining sufficient gas pressures and supporting the required loads may be used as air bag material. However, nylon, aramid, or polyester fabric coated with Neoprene®, urethane, or silicone are the most likely candidates at this time for the spherical LVA configuration. These materials would most likely be cut, bonded, and sewn to form the air bag in a manner similar to the current state of the art for manufacture of automotive frontal-impact inflatable restraints.

Figure 13:
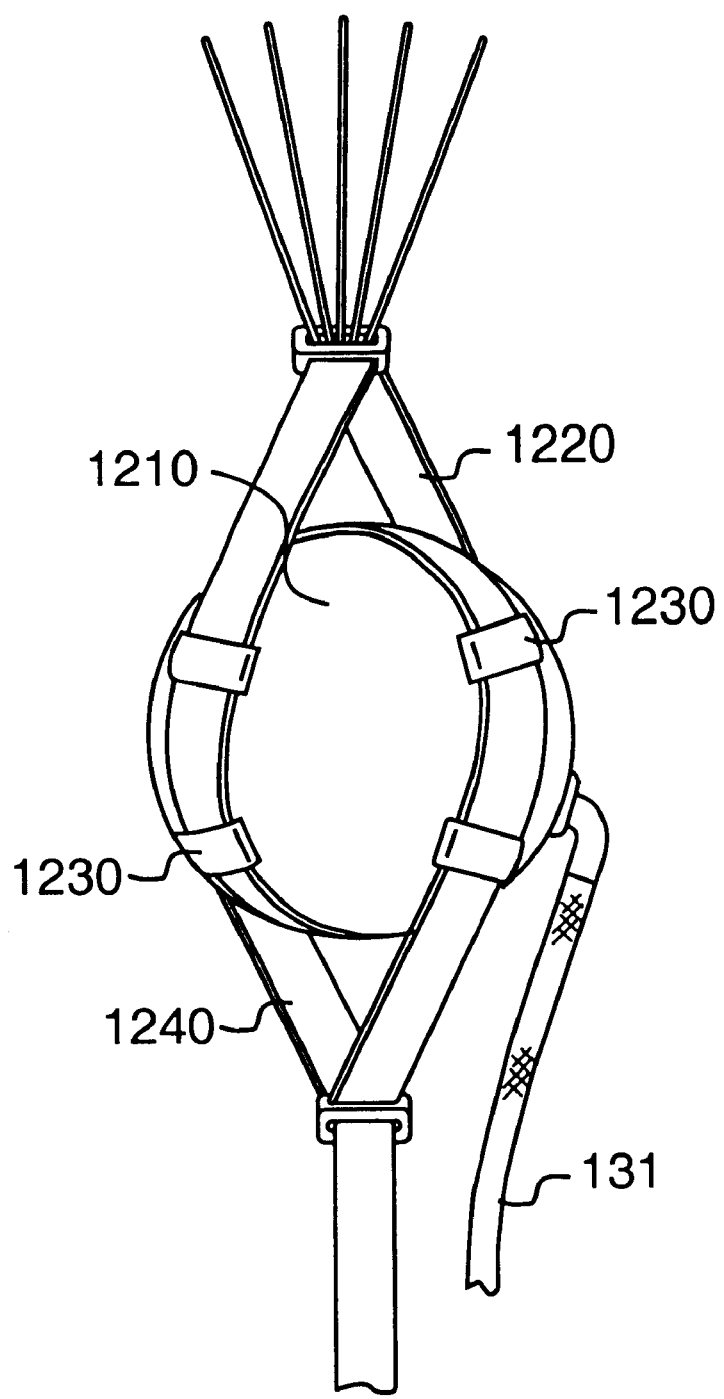
FIG. 13 shows the landing velocity attenuator system of FIG. 12 subsequent to inflation.

Although spherical air bag assemblies may be installed in parachute risers as described above, in the embodiment illustrated in FIG. 12, upper sling 1220 is wrapped under spherical air bag 1210, and attached by means of sling guides 1230 to spherical air bag 1210. Lower sling 1240 is wrapped over, and attached by means of sling guides 1230 to, air bag 1210 at a rotational position of about 90 degrees from upper sling 1220. Fully extended (in the longest condition), sling loops 1220 and 1240 are adjacent to one another with the collapsed air bag 1210 trapped between loops 1220 and 1240. Upon deployment, a portion of air bag 1210 deforms upward with upper sling 1220, and another portion of air bag 1210 deforms downward with lower sling 1240. Inflation of air bag 1210 forces opposing sling loops 1220, 1240 to slide in opposite directions and to open wider to accommodate the expanding shape of air bag 1210. Thus, a reduction in the distance between parachute and payload is achieved both by expansion in the circumference of the sling loop openings, and by their movement in opposite directions. Such an arrangement, inflated, is shown in FIG. 13

Figure 14:
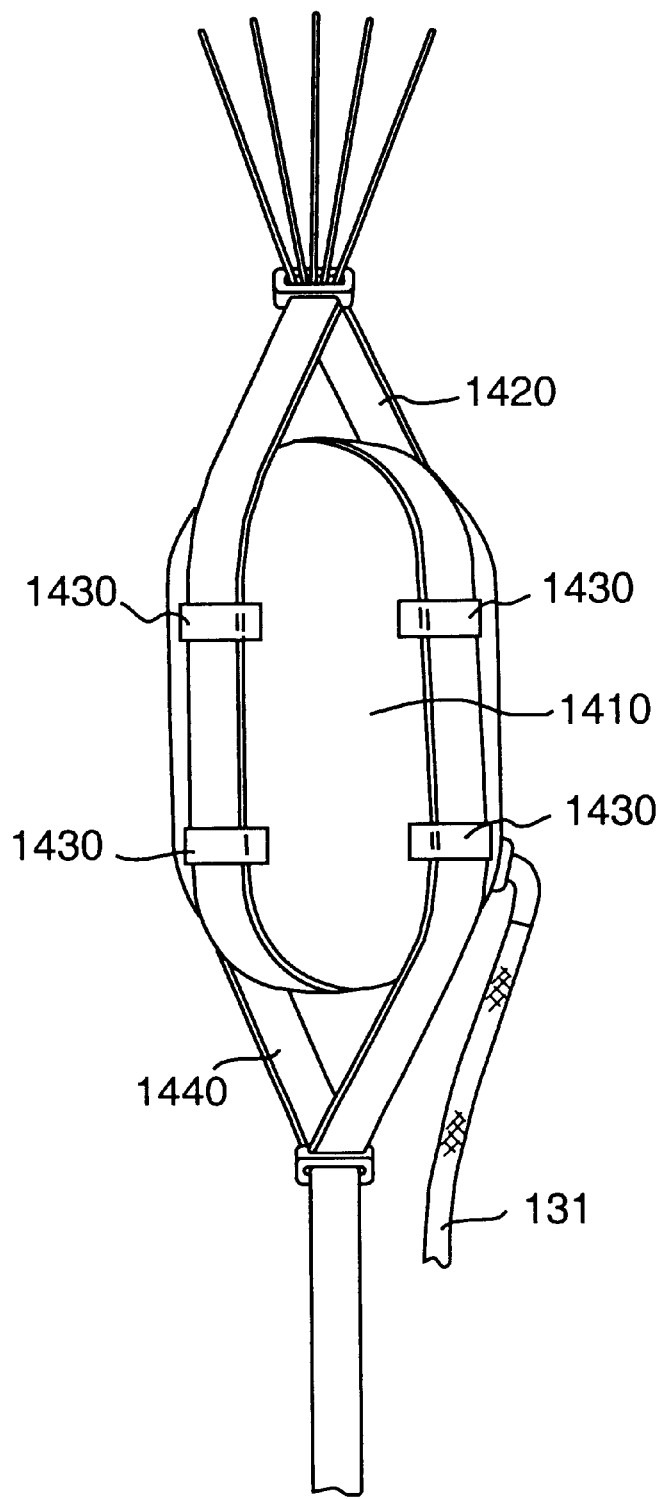
FIG. 14 shows an elongated air bag landing velocity attenuator system constructed in accordance with a preferred embodiment of the present invention after it has been deployed.

A further decrease in retraction distance may be achieved using an elongated spherical shape. FIG. 14 illustrates a configuration, subsequent to deployment, using an elongated air bag type landing velocity attenuator. In its collapsed condition prior to inflation, the general arrangement would appear much the same as that shown in FIG. 12, except that more bag material would be trapped between the sling loops. As in the more nearly spherical configuration shown in FIG. 13, a number of sling guides 1430 ensure that the loops 1420, 1440 maintain their proper position on the air bag 1410.

Figure 15:
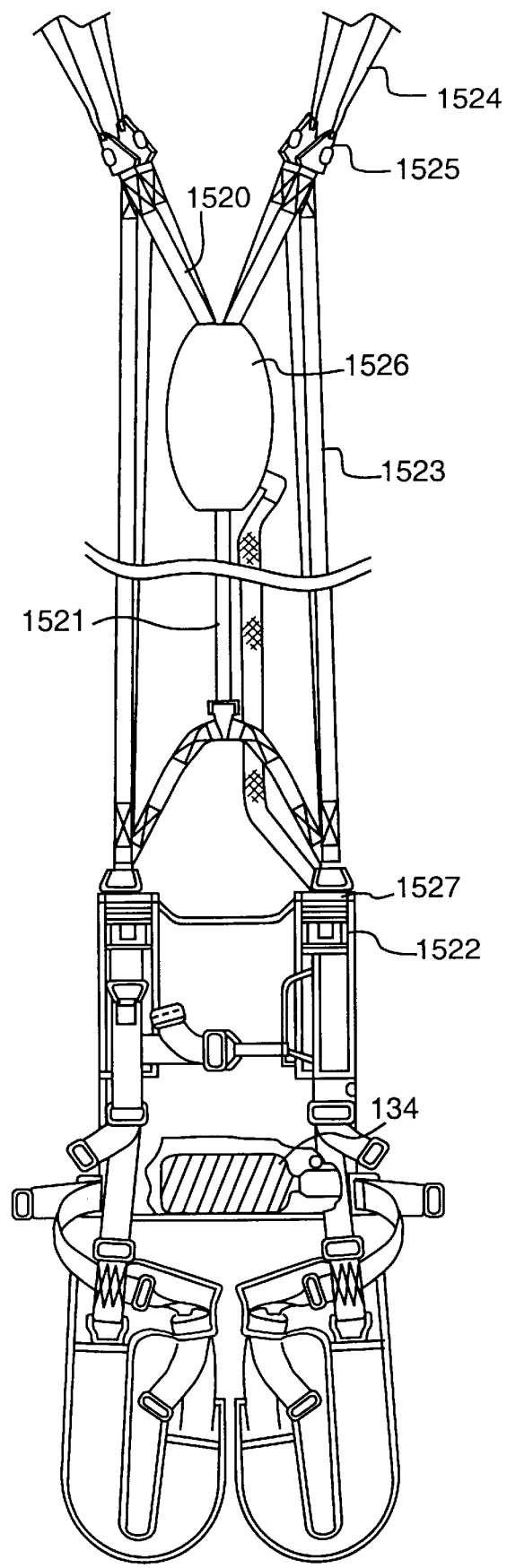
FIG. 15 shows a second preferred embodiment of a spherical landing velocity attenuator system constructed in accordance with the present invention.

FIG. 15 illustrates, prior to deployment, the basic components and approximate proportions of an integrated-strap, spherical landing velocity attenuator configuration designed to function bearing a 350-lb. parachutist and equipment load. The length of the risers 1523 from link 1527 at the top of the harness assembly 1522 to the canopy line attachment links 1525 is approximately 5 feet. A set of straps, preferably four upper 1520 and four lower 1521, connect the parachutist's harness assembly 1522 and the canopy line/riser attachment buckles 1525 to the air bag 1526 component of the landing velocity attenuator. "Linkage straps" 1520, 1521 are not sewn or otherwise attached to the exterior of air bag 1526, but are incorporated directly into the top and bottom panels of air bag 1526. Air bag 1526 itself, rather than a set of external loops or straps, functions as the load-bearing component as the bag inflates.

Figure 16:
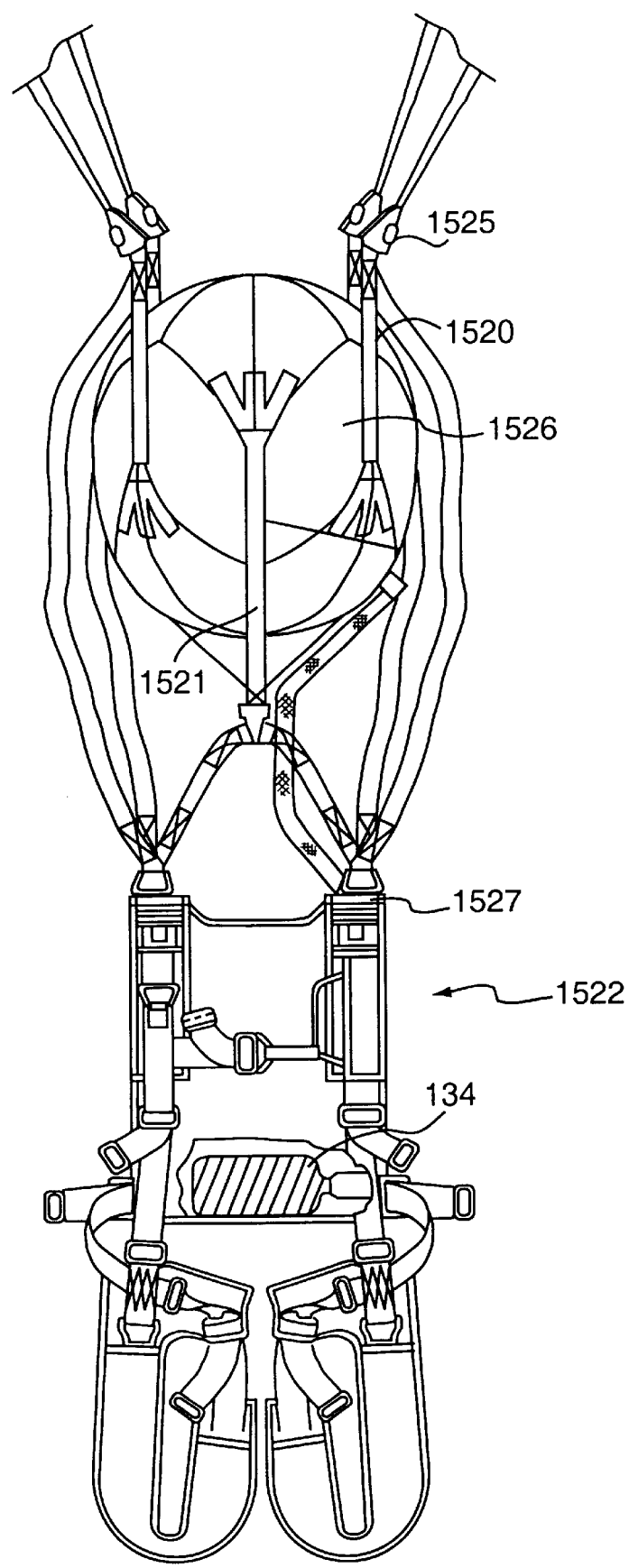
FIG. 16 shows the landing velocity attenuator system of FIG. 15 after it has been deployed.

FIG. 16 illustrates the integrated-strap, spherical landing velocity attenuator of FIG. 15 inflated. The distance between the top 1527 of the harness assembly 1522 to the canopy line attachment buckles 1525 would be reduced by, e.g., 16 inches, as the air bag is inflated, as discussed above.

Figure 5:
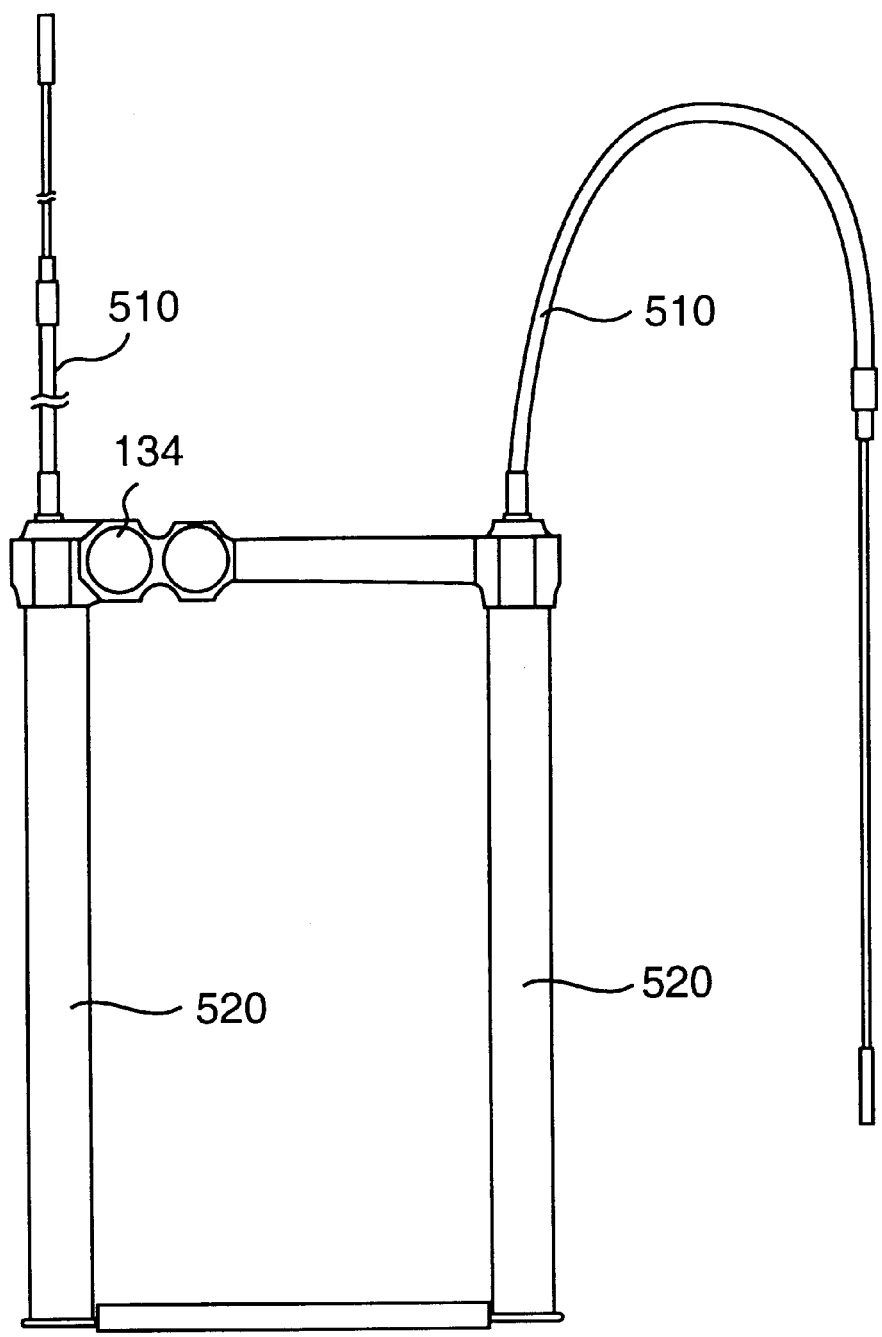
FIG. 5 is a view of a piston assembly constructed in accordance with a second preferred embodiment of the present invention.

The foregoing disclosure of embodiments of the present invention has been presented for the purpose of illustration and description. It is not intended to be exhaustive or to limit the invention to the precise forms disclosed. Many variations and modifications of the embodiments described herein will be obvious to one of ordinary skill in the art in light of the above disclosure. For example, a cylinder-type landing velocity attenuator could be configured in a number of alternative ways to accomplish the basic objective of drawing the suspended load and the canopy together. A single piston with one or more gas sources could operate a single cable connected to a single riser. Preferably at least two risers are used between the canopy and the suspended load in order to maintain the relative orientation between the two. For a two-riser configuration, either two independent systems could be activated simultaneously, or two cables could be attached to a single piston-cylinder assembly. Or a common gas source could drive two separate cable-piston-cylinder assemblies through a common gas manifold. In the dual piston assembly configuration depicted in FIG. 5, each cable assembly 510 is mounted to its own respective piston assembly 520. Similar considerations also apply to, e.g., a four-riser configuration.

In addition, as previously noted, tubular air bag based landing velocity attenuator systems may employ one or more air bags (see FIGS. 3–6). Similarly, spherical landing velocity attenuator devices can employ more than one air bag, preferably one suspended below another, in order to achieve additional displacement. A single spherical landing velocity attenuator air bag as depicted in FIGS. 12–13, intended to function with a suspended payload of approximately 350 lbs., would be inflated with approximately 50 liters of gas to a pressure of approximately 10 psig. The inflation volumes of two or more spherical landing velocity attenuator air bags arranged in a series (i.e., one atop another) would be correspondingly less, although the inflation pressure may have to be increased so that the two-bag configuration is as effective as the single-bag configuration. The length of time that any landing velocity attenuator remains inflated may vary depending on requirements of the specific application.

What is claimed is:

1. An apparatus for reducing the distance between a parachute canopy and a load suspended from the canopy prior to ground impact, comprising:
   an air bag;
   riser means connecting said air bag to the parachute canopy and to the load; and,
   an inflator assembly connected to said air bag, wherein said inflator assembly includes a means for inflating said air bag and a sensor means for automatically triggering said inflation means prior to impact,
   wherein the inflation of the air bag draws the canopy closer to the load.

2. The apparatus of claim 1, wherein said inflation means includes a gas source and a means for fluidly connecting said gas source to said air bag.

3. The apparatus of claim 2, wherein said riser means comprises an upper sling and a lower sling, wherein said upper sling is connected to the parachute and wraps underneath said air bag forming a loop, and wherein said lower sling is connected to the load and wraps over said air bag, forming an opposing loop such that inflation of said air bag forces said opposing loops to slide in opposite directions thus drawing the canopy closer to the load.

4. An apparatus according to claim 2, wherein said air bag is an inflatable tubular structure that, when deployed, increases in diameter and shortens in length, and said riser means comprises a canopy riser linking said air bag to the parachute, and a payload riser linking said air bag to the load.

5. An apparatus for reducing the distance between a parachute and a suspended load prior to ground impact, comprising:
   a plurality of air bags;
   a plurality of connecting means for connecting said air bags to both the parachute and the load, each of said air bags being incorporated into only one connecting means; and,
   an inflator assembly connected to each air bag, wherein said inflator assembly includes a means for deploying said air bag and a sensor means for automatically triggering said deployment means at a predetermined altitude.

6. The apparatus of claim 5, wherein each of said air bags is an inflatable tubular structure that, when deployed, increases in diameter and decreases in length, and each of said connecting means is a riser assembly comprising a canopy riser linking one of said air bags to the parachute, and a payload riser linking the same air bag to the load.

7. The apparatus of claim 5, wherein each of said connecting means comprises an upper sling and a lower sling, said upper sling is connected to the parachute and wraps underneath one of said air bags forming a loop, and said lower sling is connected to the load and wraps over the same air bag forming an opposing loop such that inflation of said air bag forces said opposing loops to slide in opposite directions resulting in a reduction in distance between the parachute and the load.

8. An apparatus for reducing the distance between a canopy of a parachute and a suspended load prior to ground impact, comprising:
   a. a piston assembly comprising a piston, a housing for said piston, and an automatic trigger means for activating said piston, wherein said automatic trigger means includes a means for activating said piston and a sensor means for automatically triggering said activation means at a predetermined altitude; and
   b. a cable assembly linking said piston to the canopy of the parachute such that when said trigger means activates said piston, the piston pulls at least one cable in the cable assembly such that the canopy of the parachute is drawn closer to the load, reducing the velocity of the load at impact, wherein said at least one cable has a first end connected to said piston and a second end connected to the canopy of the parachute.

9. The apparatus of claim 8, wherein said cable assembly includes at least one riser having a first end connected to a parachute container and a second end connected to the canopy, and wherein said at least one cable comprises a portion which is slidably housed within a sheath, said at least one cable having a first end connected to said piston and a second end connected to the first end of a riser, and each sheath having a first end mounted onto the top of said container and a second end attached to a riser at a point below the second end of the riser.

10. The apparatus of claim 9, wherein said activation means is a gas source.

11. A device for reducing the final descent velocity of a parachute payload, comprising:
   (a) a piston assembly comprising a piston;
   (b) a cable assembly connecting a parachute canopy to a payload, comprising a means for drawing the parachute canopy and the payload closer together; and,
   (c) an activation means comprising a gas source fluidly connected to the piston assembly, said activation assembly including a piston activation means and an automatic trigger means for automatically triggering the activation means prior to impact, wherein said trigger means includes a sensor means for detecting proximity to ground and means for initiating gas flow.

12. A device for reducing the final descent velocity of a parachute payload, comprising:
   (a) an inflatable structure;
   (b) at least one riser linking said inflatable structure to a parachute canopy and for linking the inflatable structure to the parachute payload; and,
   (c) at least one inflator fluidly connected to the inflatable structure, said inflator including a means for deploying said inflatable structure and an automatic trigger means for automatically triggering said deployment means at a predetermined position prior to impact.

13. The device of claim 12, wherein said inflatable structure includes a braided tube comprised of continuous high-strength fibers forming intersecting spirals and impregnated with an elastomer, wherein prior to deployment, the spirals are stretched longitudinally and the braided tube has a relatively small diameter and subsequent to inflation the fibers orient themselves so that said braided tube increases in diameter and shortens in length.

14. The device of claim 12, wherein said inflatable structure comprises a spherical air bag.

15. The device of claim 14, wherein said spherical air bag is an elongated spherical air bag.

16. A parachute system comprising:
   (a) a parachute canopy;
   (b) risers connecting the parachute assembly to a load, wherein the risers are attached to an upper sling which loops around an air bag from above and is attached to the air bag, and wherein the load is attached to a lower sling which loops around the air bag below and is attached to the air bag;
   (c) a source of gas;
   (d) trigger means; and
   (e) means for drawing the parachute canopy and the load closer together, wherein the means for drawing the parachute canopy and the load closer together comprises an air bag,
   wherein said means for drawing the parachute canopy and load closer together is fluidly connected to the gas source, and
   wherein the trigger means initiates release of gas from the gas source to activate the means for drawing the parachute canopy and the load closer together.

17. The parachute system of claim 16, wherein the means for drawing the parachute canopy and the load closer together comprises a piston assembly, wherein, upon release of gas from the gas source, the gas drives a piston in the piston assembly to draw the parachute canopy and the load closer together.

18. The parachute system of claim 16, wherein the air bag is a spherical air bag.

19. The parachute system of claim 16, wherein the air bag is an elongated air bag.

* * * * *

UNITED STATES PATENT AND TRADEMARK OFFICE
CERTIFICATE OF CORRECTION

PATENT NO.     : 6,224,019 B1  
DATED          : May 1, 2001  
INVENTOR(S)    : Peterson et al.

Page 1 of 1

It is certified that error appears in the above-identified patent and that said Letters Patent is hereby corrected as shown below:

<u>Title page,</u>
ABSTRACT,
Line 6, "parcute" should be spelled -- parachute --

<u>Column 3,</u>
Line 42, "are depolyment causes" should read -- are deployed, this causes --

<u>Column 6,</u>
Line 59, "ITSO" should read -- ITS® --

<u>Column 8,</u>
Line 1, "airbag 910" should read -- airbag 1210 --

Signed and Sealed this

Twenty-eighth Day of May, 2002

*Attest:*

JAMES E. ROGAN
*Attesting Officer*  *Director of the United States Patent and Trademark Office*